United States Patent
Finkeldei (12) United States Patent (10) Patent No.: US 12,291,085 B2
(45) Date of Patent: May 6, 2025

(54) VEHICLE WINDOW ASSEMBLY AND TRANSPORT PROTECTION STRIP FOR USE WITH A VEHICLE WINDOW ASSEMBLY

(71) Applicant: PMA/TOOLS GmbH, Willich (DE)

(72) Inventor: Jens Finkeldei, Moenchengladbach (DE)

(73) Assignee: PMA/TOOLS GMBH, Willich (DE)

( * ) Notice: Subject to any disclaimer, the term of this patent is extended or adjusted under 35 U.S.C. 154(b) by 343 days.

(21) Appl. No.: 17/868,793

(22) Filed: Jul. 20, 2022

(65) Prior Publication Data

US 2023/0023468 A1 Jan. 26, 2023

(30) Foreign Application Priority Data

Jul. 22, 2021 (DE) ........................ 10 2021 119078.9

(51) Int. Cl.
*B60J 1/00* (2006.01)
(52) U.S. Cl.
CPC ...................................... *B60J 1/006* (2013.01)
(58) Field of Classification Search
USPC ....... 296/146.15, 146.16, 178, 201, 93, 84.1
See application file for complete search history.

(56) References Cited

U.S. PATENT DOCUMENTS

| | | | | |
|---|---|---|---|---|
| 7,703,830 B2* | 4/2010 | Earl | ......................... | B60J 10/70 296/84.1 |
| 7,870,958 B1* | 1/2011 | Gross | ..................... | B65D 81/07 206/448 |
| 8,444,205 B2* | 5/2013 | Flammer | .................. | B60J 10/70 296/93 |
| 8,449,016 B2* | 5/2013 | Timmermann | .......... | B60J 10/70 277/921 |
| 10,239,386 B2* | 3/2019 | De Paoli | .................. | B60J 10/18 |
| 11,034,224 B2 | 6/2021 | Bergmann et al. | | |
| 11,505,051 B2* | 11/2022 | Ortmueller | .............. | B60J 10/27 |

(Continued)

FOREIGN PATENT DOCUMENTS

| | | | | |
|---|---|---|---|---|
| DE | 3606566 A | * | 9/1987 | ................ B60J 1/02 |
| DE | 202008009712 U1 | | 11/2008 | |
| DE | 102011054801 A1 | | 4/2013 | |

(Continued)

*Primary Examiner* — Amy R Weisberg
*Assistant Examiner* — Veronica M Shull
(74) *Attorney, Agent, or Firm* — LEYDIG, VOIT & MAYER, LTD.

(57) ABSTRACT

A vehicle window assembly includes a vehicle window, a profile strip and a transport protection strip. The vehicle window includes a first main face, a second main face facing away from the first main face, and an edge connecting the first to the second main face. The profile strip is arranged at a peripheral region of the vehicle window by a first connecting region, and has a second connecting region comprising a receiving groove configured to connect to a component adjacent to the vehicle window. The transport protection strip includes an insertion portion which is received in, and releasably connected to, the receiving groove. The transport protection strip includes a contact portion which at least partially overlaps the first main face of the vehicle window in the peripheral region and is releasably connected to the vehicle window by a connector acting between the contact portion and the first main face.

20 Claims, 5 Drawing Sheets

(56) References Cited

U.S. PATENT DOCUMENTS

2007/0246966 A1    10/2007  Polke

FOREIGN PATENT DOCUMENTS

| | | | |
|---|---|---|---|
| DE | 102012110472 B3 | 3/2014 | |
| DE | 102016109471 A1 | 11/2017 | |
| DE | 102016125447 A1 | 6/2018 | |
| EP | 2 253 556 A1 | 11/2010 | |
| EP | 2 521 678 B1 | 5/2016 | |
| KR | 20040048014 A * | 6/2004 | ............ B60J 10/16 |
| WO | WO 2006/002891 A2 | 1/2006 | |

\* cited by examiner

VEHICLE WINDOW ASSEMBLY AND TRANSPORT PROTECTION STRIP FOR USE WITH A VEHICLE WINDOW ASSEMBLY

CROSS REFERENCE TO RELATED APPLICATION

This application claims benefit to German Patent Application No. DE 10 2021 119 078.9, filed on Jul. 22, 2021, which is hereby incorporated by reference herein.

FIELD

The invention relates to a vehicle window assembly, comprising a vehicle window, a profile strip and a transport protection strip. The vehicle window has a first main face, a second main face facing away from the first main face, and an edge connecting the first main face to the second main face. The profile strip is arranged at a peripheral region of the vehicle window via a first connecting region and has a second connecting region with a receiving groove for connection to a component adjacent to the vehicle window. The transport protection strip is connected to the receiving groove of the profile strip by means of an insertion portion. Furthermore, the invention relates to a transport protection strip, in particular for use in a vehicle window assembly according to the invention.

BACKGROUND

For connection of a vehicle window mounted on a vehicle body to an adjacent component, such as a windshield with a cowl adjacent to the windshield, profile strips are known in the prior art, which are arranged at a peripheral region of the vehicle window. In general, the profile strip is fixed to the window by means of a double-sided adhesive tape between the profile leg and the window. The profile strip is usually already attached to the vehicle window by the window manufacturer. The assembly of window and profile strip is then delivered to a production or repair facility for installation in a vehicle body. After assembly, a snap-engagement rib of the adjacent component is subsequently joined with a receiving groove of the profile strip.

The transport and storage of the assembly comprising the window and the profile strip generally takes place with the window in an upright posture, whereby one edge of the window, provided with the profile strip, is supported on a support surface, for example a base or carrier of a cardboard box or transport rack. To prevent the weight of the window acting on the profile strip from deforming the receiving groove of the profile strip, which would make subsequent assembly of the adjacent component more difficult, a transport protection strip, often also referred to as a keder strip, is inserted in the receiving groove prior to transport and storage. Such keder strips are known, for example, from EP 1 763 446 A2, DE 10 2012 110 472 B3, EP 2 521 678 B1 or EP 2 253 556 A1.

The keder strips known from the prior art have proven unsatisfactory in practical use for several reasons. For example, when windows are stored in an upright posture, problems sometimes arise due to partial detachment of the profile strip from the window. To ensure that the keder strips are held securely in the receiving groove and/or on the profile strip, they have to be configured to match a specific profile strip geometry. In addition, the removal of keder strips often requires the use of tools or the provision of pull-out tabs, which have to be manufactured, arranged elaborately between the profile strip and the keder strip, and disposed of after use.

SUMMARY

In an embodiment, the present invention provides a vehicle window assembly comprising a vehicle window, a profile strip and a transport protection strip. The vehicle window includes a first main face, a second main face facing away from the first main face, and an edge connecting the first main face to the second main face. The profile strip is arranged at a peripheral region of the vehicle window by a first connecting region, and has a second connecting region comprising a receiving groove configured to connect to a component adjacent to the vehicle window. The transport protection strip includes an insertion portion which is received in, and releasably connected to, the receiving groove. The transport protection strip also includes a contact portion which at least partially overlaps the first main face of the vehicle window in the peripheral region and is releasably connected to the vehicle window by a connector acting between the contact portion and the first main face.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention improve the transport and storage of windows, particularly with respect to the protection of the profile strip and/or the window, as well as with respect to handling.

These improvements are achieved according to an embodiment of the invention in a vehicle window assembly of the type initially mentioned, by the transport protection element comprising a contact portion which at least partially overlaps a first main face of the vehicle window in the peripheral region and is releasably attached to the vehicle window by means of a connector acting between the contact portion and the first main face.

In contrast to the prior art, the vehicle window assembly according to an embodiment of the invention not only provides for a releasable fixing of the transport protection strip to the profile strip, but also provides for an additional—and likewise releasable-fixing of the transport protection strip to the vehicle window, which is implemented by means of a contact portion comprised by the transport protection strip and by means of a connector acting between the contact portion and the first main face of the window.

This has several advantageous effects. For example, the overall vehicle window assembly consisting of window, profile strip and transport protection strip is considerably stabilized, which prevents detachment of the profile strip from the window, particularly when forces are applied to the profile strip at unfavorable angles.

The additional fixing between the transport protection strip and the window also helps to prevent displacement, e.g. tilting, of the insertion portion within the receiving groove and/or inadvertent disengagement of the insertion portion from the receiving groove. The insertion portion of the transport protection strip is thus additionally secured in the receiving groove of the profile strip, so that reliable retention of the insertion portion in the receiving groove is ensured. In this way, it is possible to work with greater tolerances when manufacturing the transport protection strip and/or to design a transport protection strip so that it can be used in combination with different profile strips and/or receiving grooves having different cross-sections, thereby increasing logistical flexibility and reducing time and expense.

The contact portion at least partially overlapping the peripheral region of the first main face of the vehicle window provides additional protection for the sensitive peripheral or peripheral regions of the window.

The first connecting region of the profile strip can comprise a fastening leg that is fixed to the edge portion of the vehicle window. If the vehicle window is a laminated glass window, the fastening leg can be fixed between the glass sheets laminated together to form the composite window. Preferably, however, the fastening leg is fixed to the first main face of the window, preferably, in particular, to the second main face of the window. In the latter case, the contact portion of the transport protection profile does not first need to bridge the fastening leg of the profile strip before coming into contact with the window, which allows the transport protection profile to be designed in a particularly compact manner. A double-sided adhesive tape, for example, can be used to fix the fastening leg to the window.

The first connecting region can also be U-shaped in cross-section and can comprise two fastening legs which jointly embrace the window in the peripheral region, one leg resting against the first main face and another leg resting against the second main face, whereby the peripheral region of the vehicle window is held between the two legs, where it can be clamped and/or adhesively bonded, for example.

Preferably, in an installed state on the vehicle, the first main face forms an outer side facing away from a vehicle interior, while the second main face, in the installed state, forms an inner side facing the vehicle interior. As a result, the contact portion is arranged on the outer side of the window in the installed state and is particularly easy to access, thus enabling removal of the transport protection profile from the profile strip and the window before installation of the adjacent component.

The insertion portion can be inserted into, and received in, the receiving groove. The insertion portion can be secured in the receiving groove in a frictional and/or interlocking manner. For this purpose, the dimensions of the insertion portion can be matched to the dimensions of the receiving groove in such a way that the insertion portion is at least substantially snugly connected to the receiving groove. For a stronger connection, the cross-sections of the insertion portion and the receiving groove can also be designed to have snap-engaging fixing elements corresponding to one another.

It has proven advantageous if the insertion portion and the contact portion, viewed in cross-section, extend in directions essentially transverse to one another. In this way, it is possible to limit the insertion depth of the insertion portion in the receiving groove and/or to prevent tilting of the insertion portion in the receiving groove.

According to an embodiment of the invention, the connector may comprise an adhesive, an adhesive film strip, a double-sided adhesive tape, a suction cup and/or a magnetic element. The aforementioned elements may be provided individually, multiple times and/or in combination with each other. An adhesive film strip can preferably be designed in such a way that by stretching it essentially in the bonding plane, i.e. parallel to the respective main face of the window, it can be removed from the window in a residue-free and non-destructive manner. Advantageously, the connector remains on the transport protections strip after removal of the transport protection strip from the vehicle window and the profile strip. In the case of double-sided adhesive tape, this is preferably adapted to the different adhesive surfaces in such a way that a first adhesion force on the window is less than a second adhesion force on the contact portion, so that the adhesive tape remains on the contact portion when the transport protection strip is removed from the window.

Advantageously, during or after removal of the transport protection strip, the connector can be detached from the window without leaving any residue, while, when mounting the contact portion of the transport protection strip at the peripheral region of the first main face of the vehicle window, it is easily and quickly mounted both on the contact portion and on the vehicle window and guarantees secure retention of the contact portion on the vehicle window for a predetermined fastening period.

It is advantageous if the transport protection strip comprises the connector. The connector then forms part of the transport protection strip, i.e. it is already arranged on the contact portion before the transport protection strip is used. In this way, the contact portion can be easily attached to the first main face of the vehicle window without the need to first apply or attach a connector to the contact portion or to an area, to be suitably determined, on the first main face of the window.

The insertion portion and/or the contact portion of the transport protection strip can be segmented along a longitudinal extension of the transport protection strip. Alternatively or additionally, the connector can be segmented along the longitudinal extension of the transport protection strip and/or be formed from several fixing elements. In the context of the present disclosure, segmentation of an element of the transport protection strip is understood to mean that the element in question has incisions, gaps or interruptions offset relative to one another in a longitudinal direction of the transport protection strip, resulting in a comb-like structure. This type of structure facilitates deformation of the transport protection strip and thus adaption to a contour of the peripheral region of the window and to the curve of the profile strip adapted to this contour.

It is also within the scope of an embodiment of the invention to provide a transport protection strip which is shorter than the profile strip arranged on the window and which is arranged, for example, at a position which comes into contact with a base or a carrier of the storage or transport container during storage and transport of the vehicle window assembly in an upright posture. Likewise, two or more transport protection strips can be provided, which are arranged offset from one another along the longitudinal direction of the profile strip, which can also be referred to as transport protection strip segments. This can be seen—in accordance with the segmentation of individual portions or elements of the transport protection strip (viewed in cross-section) as explained above, wherein the transport protection strip is still uninterrupted in the longitudinal direction—as a segmentation of the entire transport protection strip (seen in cross-section).

The transport protection strip can have a first strip portion comprising the insertion portion and a second strip portion comprising the contact portion, wherein the first strip portion is joined to the second strip portion. The strip portions can be connected by adhesive bonding, welding, snap-fitting, clipping, clamping or the like to each other in a releasable or non-releasable manner. The strip portions can be made of identical or different materials, for example PE (polyethylene), PP (polypropylene), PVC (polyvinyl chloride), PS (polystyrene), polyester or PC (polycarbonate). The first strip portion is preferably formed by an extruded profile strand. The second portion may comprise an extruded profile strand that is adhesively bonded to the first strip portion and to the main face of the window. The second strip portion may alternatively comprise a (single-sided) adhesive tape adhesively bonded to the first strip portion and to the main face of the window.

According to a further embodiment of the invention, the transport protection strip has a support portion. The support portion extends, viewed in cross-section, in a direction essentially parallel to the contact portion and/or the first main face of the vehicle window and, with respect to the insertion portion, facing away from the contact portion. In particular, the support portion projects beyond the second connecting region of the profile strip in a projection onto a projection line orthogonal to a longitudinal extension direction of the transport protection strip and inclined with respect to the first main face of the vehicle window by an angle having an absolute value not exceeding 40°, preferably at most 35°, particularly preferably at most 30°. Thus, the support portion is arranged adjacent to the second connecting region of the profile strip and can serve as a supporting element which, when the window is standing upright, is supported on a supporting surface, for example a base or support of a transport or storage container, and together with the second connecting region, preferably essentially alone, bears the weight of the vehicle window assembly. In this way, damage to the profile strip can be avoided.

The support portion can at least partially embrace and/or overlap the second connecting region on a side of the second connecting region facing away from the edge of the vehicle window. This provides even more reliable protection for the profile strip during transport and storage.

The improved transport and storage of windows, particularly with respect to the protection of the profile strip and/or the window, as well as with respect to handling, is further achieved according to an embodiment of the present invention by a transport protection strip comprising an insertion portion for connection with a receiving groove of a profile strip arranged at a peripheral region of a vehicle window, and comprising a contact portion provided to at least partially overlap a first main face of a vehicle window in the peripheral region of the window and to be releasably fixed to the vehicle window by means of a connector acting between the contact portion and the first main face, wherein the connector is preferably arranged on the contact portion.

Advantages as well as further preferred features of the transport protection strip according to embodiments of the invention can be derived from the above description of the vehicle window assembly, to which reference is made to avoid undue repetition.

The "regions", "portions" and other elements and features of the profile strip and the transport protection strip explained in the above description of embodiments of the invention and in the following description of the embodiments each refer—unless otherwise stated—to a cross-section perpendicular to a longitudinal extension direction of the profile strip or perpendicular to a longitudinal extension direction of the transport protection strip. Both strips can each advantageously be manufactured in an extrusion process. The longitudinal extension direction will correspond to the direction of extrusion.

In the context of the present disclosure, "in an upright posture" should be understood to mean that the window is oriented in such a way that it is at least essentially balanced, i.e., that the window is subjected to as little tilting moment as possible. In the most straightforward case of a planar window, this means (in the strictest sense) an orientation in which an upper edge of the window is disposed substantially perpendicular above a lower edge of the window (equivalent to saying the window or the first main face of the window is oriented perpendicular to a horizontal support surface). In a broader sense, orientations deviating by ±45° from the above are also considered to be in an upright posture. In the case of a curved window, "in an upright posture" shall be understood to mean that the window rests on an edge in an orientation deviating by at most ±45° from a tilting moment-free orientation. Depending on the shape of the window and the extent of the curvature, tilting moment-free orientation can be achieved by arranging one edge of the windshield (e.g., the upper/rear edge in the installed state in the direction of the vehicle and travel) at least essentially perpendicular above another edge (e.g., the lower/front edge in the installed state in the direction of the vehicle and travel) of the window.

When defining directions, orientations or angles specified with reference to a main face of the window, the orientation of the main face is to be used in a region that is not too far removed from the profile strip or the transport protection strip, preferably in the peripheral region of the window.

Further advantages and features of embodiments of the invention can also be derived from the following description of exemplary embodiments and the drawings. All features described and/or illustrated constitute the subject matter of embodiments of the present invention, either individually or in any combination.

Figure 1:
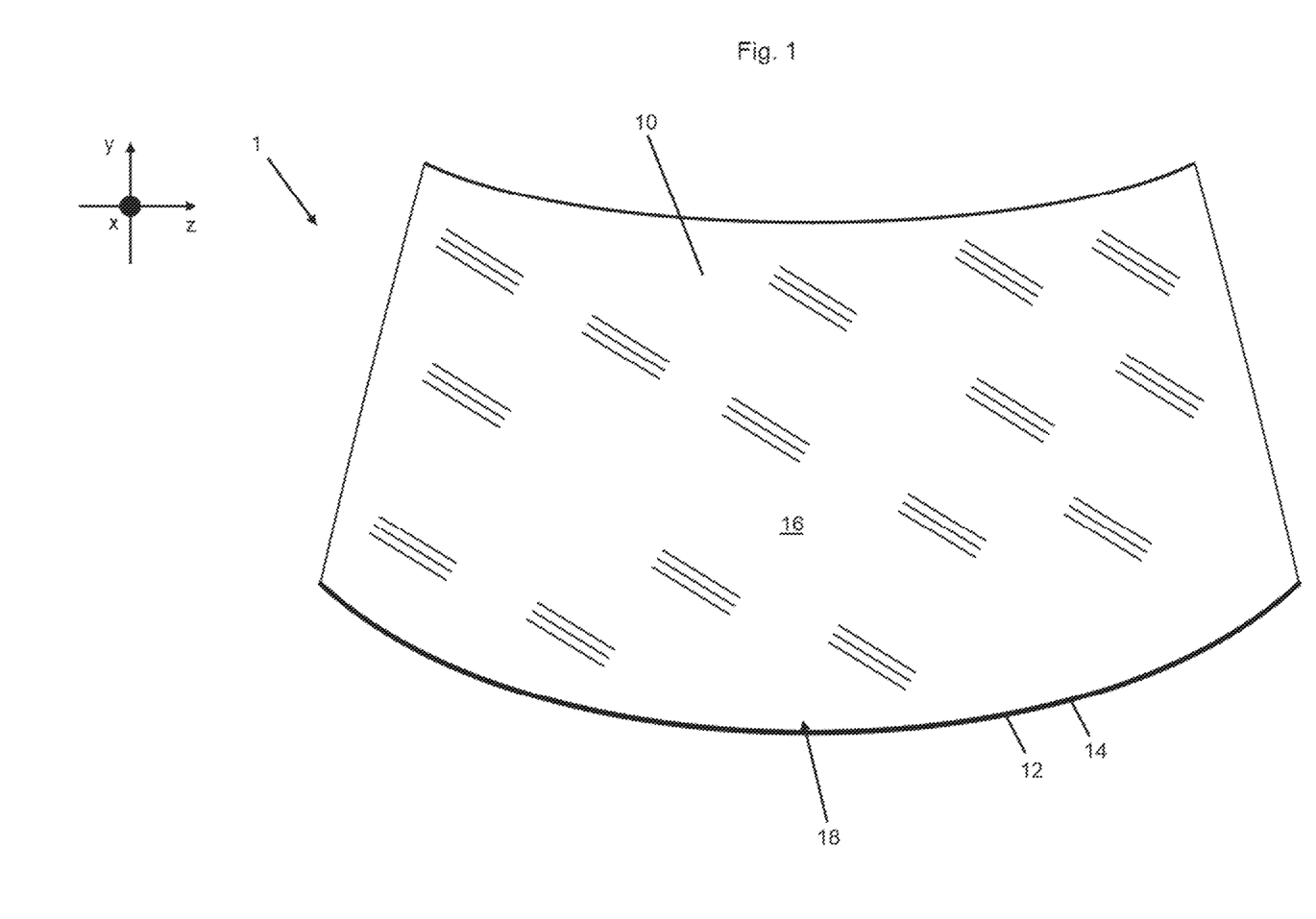
FIG. 1 shows a top view of a vehicle window assembly comprising a vehicle window, a profile strip, and a transport protection strip.

FIG. 1 shows a vehicle window assembly 1 according to an embodiment of the invention, comprising a vehicle window 10, a profile strip 12, and a transport protection strip 14. The vehicle window 10 shown in a plan view of a first main face 16 is in particular a windshield for a motor vehicle. The profile strip 12 and the transport protection strip 14 are fixed to a lower peripheral region 18 of the vehicle window 10, each of which extends substantially along the width of the vehicle window 10 in the example shown.

In FIG. 1 and in the following FIGS. 2 to 5, a coordinate system is shown in each case for orientation purposes. The x axis is oriented essentially perpendicular to the first main face 16 of the window 10. The y axis is oriented essentially parallel to the main face 16 and essentially perpendicular to an edge 20 (see FIG. 2) of the window 10. The z axis is oriented perpendicular to the x axis and perpendicular to the y axis, and thus essentially parallel to a longitudinal extension direction of the profile strip 12 and essentially parallel to a longitudinal extension direction of the transport protection strip 14. The window 10 can have a 2D or a 3D curvature, and the longitudinal extension directions can be curved.

FIGS. 2 to 5 show different embodiments of the vehicle window assembly 1 according to the invention and of the transport protection strip 14 according to the invention, each in a cross-section perpendicular to the longitudinal extension directions of the profile strip 12 and the transport protection strip 14 (i.e. perpendicular to the z axis). FIGS. 2 to 5 are initially described together, with identical or functionally identical elements each having identical reference numerals. Differences are discussed further below with reference to the respective figures.

The vehicle window 10 shown in FIGS. 2 to 5 has a first main face 16, a second main face 22 facing away from the first main face 16, and an edge 20 connecting the first main face 16 to the second main face 22.

The profile strip 12 has a first connecting region 24, which comprises a fastening leg 26, which is fixed to the second main face 22 of the window 10 in the peripheral region 18 by means of double-sided adhesive tape 28. In a transition region from the first connecting region 24 to a second connecting region 30, a base leg 32 is arranged to abut the edge 20 of the window 10 and, together with the fastening leg 26, forms an approximately L-shaped receiving recess for the peripheral region 18 of the window 10. In an installed state on the motor vehicle, the first main face 16 forms an outer side facing away from the vehicle interior, while the second main face 22 forms an inner side facing the vehicle interior.

The second connecting region 30 of the profile strip 12 has a substantially U- or V-shaped receiving groove 34 for (subsequent) releasable fixing of the vehicle window 10 to a component adjacent to the vehicle window 10, for example a cowl. The receiving groove 34 is formed between a spring leg 36 and the base leg 32. A free end 38 of the spring leg 36 and a free end 40 of the base leg 32, which extends toward the spring leg 36, define a receiving opening 42 for a mounting rib provided on the adjacent component. A sealing element 44 in the form of a sealing lip is arranged on the base leg 32 and bears against the edge 20 of the vehicle window 10.

The transport protection strip 14 comprises an insertion portion 46, which is received in and releasably joined to the receiving groove 34 of the profile strip 12. The transport protection strip 14 further comprises a contact portion 48, which is releasably connected to the first main face 16 of the window 10 by means of a connector 50 in the form of double-sided adhesive tape or an adhesive film strip, and which overlaps the peripheral region 18 of the first main face 16 of the window 10.

FIGS. 2 to 5 each show a support surface 52, which could for example be a window rack support or a base of a cardboard box. The vehicle window assembly 1 is depicted in an upright posture, reflecting the typical storage and transport situation, with the profile strip 12 and/or the transport protection strip 14 being supported on the support surface 52. In this situation, the insertion portion 46 of the transport protection strip 14 stabilizes the receiving groove 34 of the profile strip 12 and limits or prevents deformation of the spring leg 36, which would otherwise result in narrowing of the receiving opening 42 compromising subsequent attachment to the adjacent component.

Figure 4A:
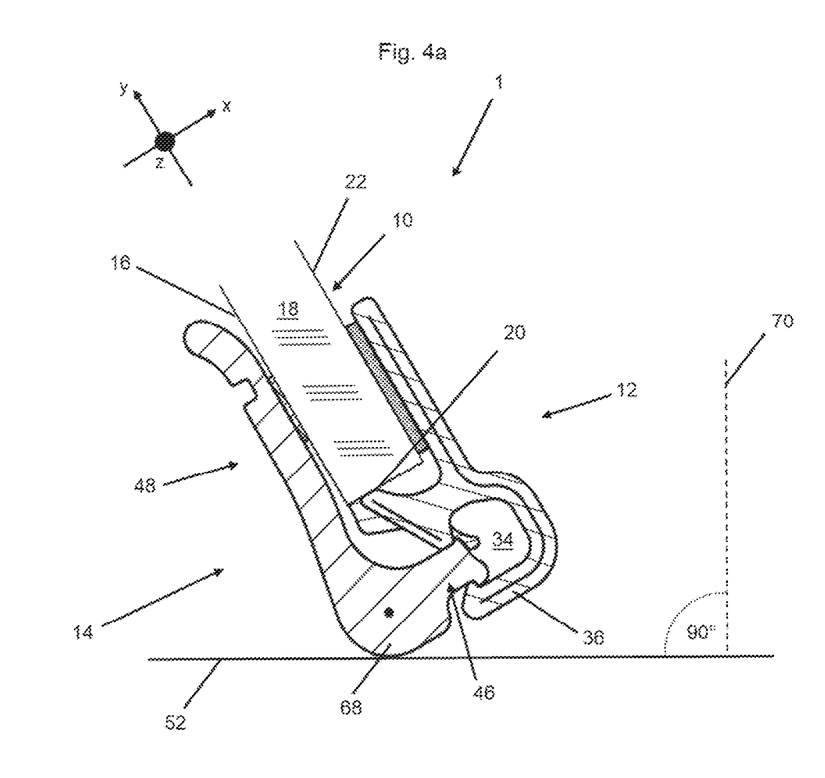
FIGS. 4a and 4b each show a vehicle window assembly according to a further embodiment of the invention.
Figure 4B:
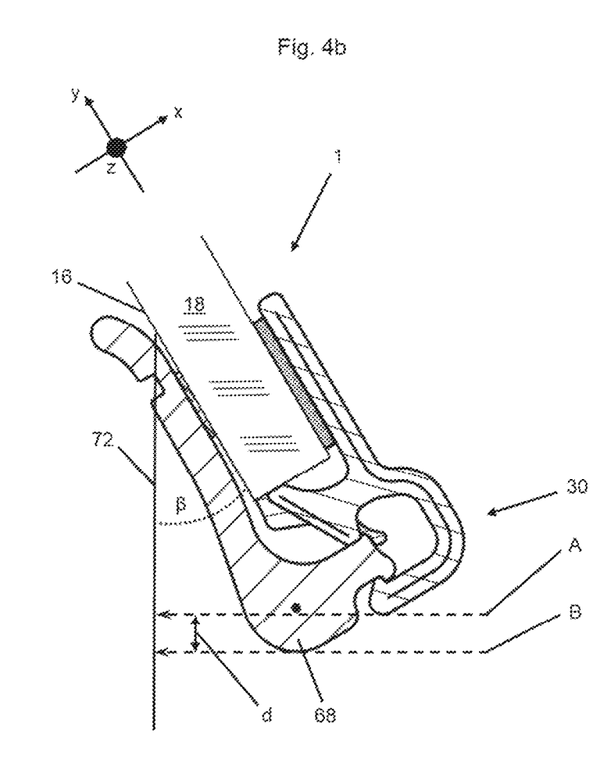

The transport protection strip 14 is connected to the profile strip 12 via its insertion portion 46 and is simultaneously connected to the vehicle window 10 via its contact portion 48 and the connector 50, which gives the assembly comprising window 10, profile strip 12 and transport protection strip 14 a high degree of stability. In this way, shearing or detachment of the profile strip 12 from the window 10 is prevented even in the case of unfavorable angles between the peripheral region 18 of the window 10 and the support surface 52, which is particularly common in the case of curved windows (cf. FIG. 4 and the following description with reference to FIG. 4).

The contact portion 48 has a curved handling portion 56 at its free end 54, which can be gripped manually or with the aid of a tool to remove the contact portion 48 from the window 10 and subsequently the transport protection profile 14 from the profile strip 12. A material thinning is provided on the contact portion 48 in the form of a recess 58 provided on the side facing away from the main face 16 and approximately at the level of an upper end of the adhesive tape 50. When gripped, this enables the handling portion 56 to be easily bent into a position convenient for further handling even before the adhesive connection between the contact portion 48 and the first main face 16 is detached.

Figure 2:
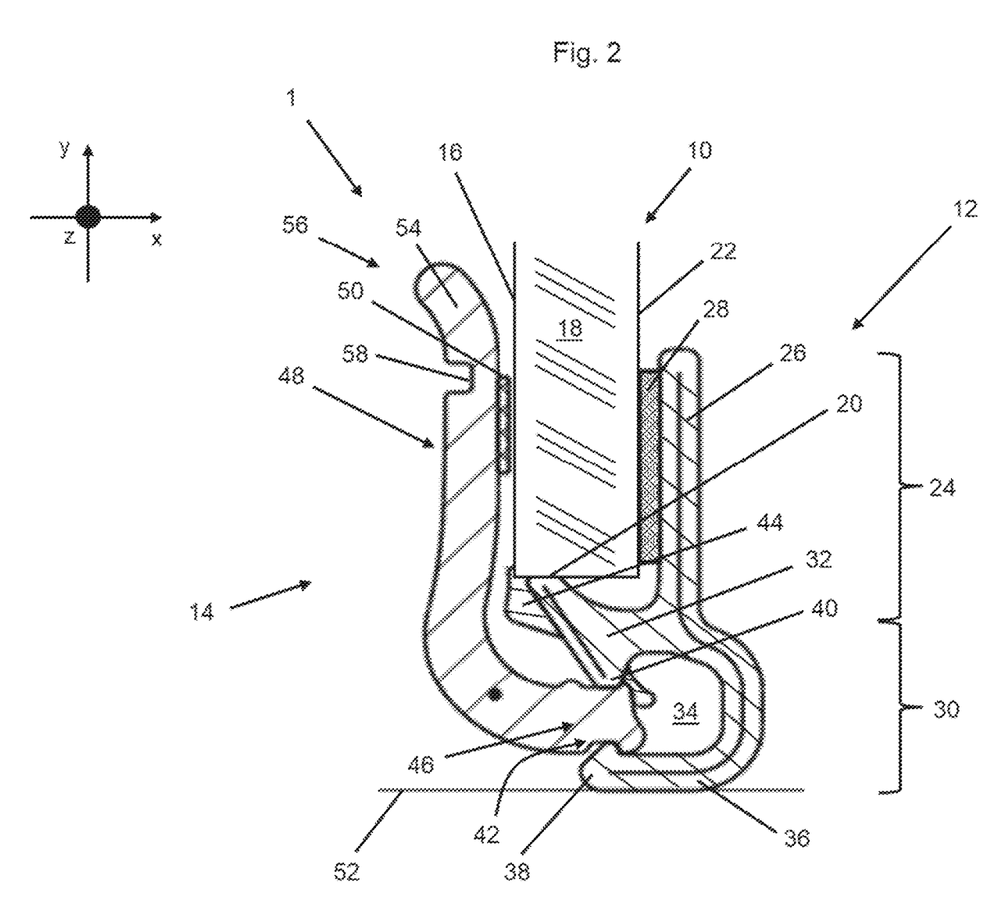
FIG. 2 shows a sectional view of a vehicle window assembly according to one embodiment of the invention.

In the embodiment depicted in FIG. 2, the vehicle window assembly 1 comprises an integrally formed transport protection strip 14 comprising a substantially L-shaped cross-section. The contact portion 48 and the insertion portion 46 of the transport protection strip 14 extend transversely, essentially perpendicular, to one another. A double-sided adhesive tape is provided as the connector 50.

Figure 3:
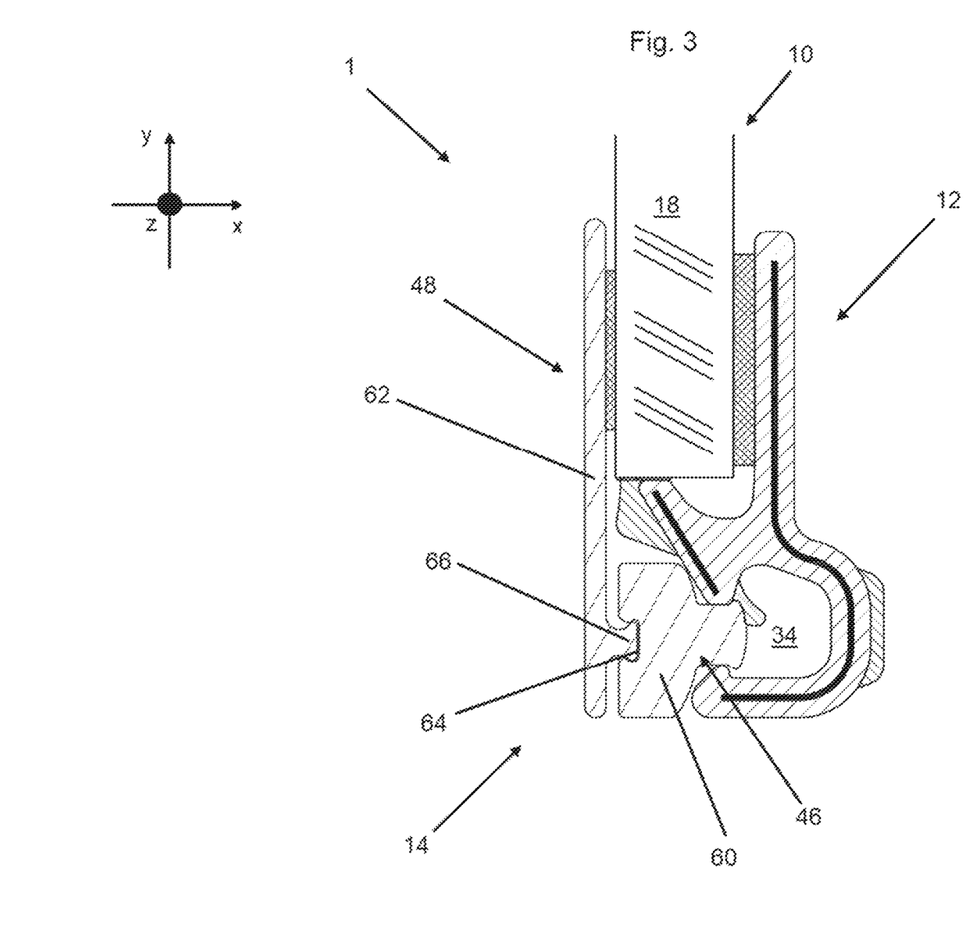
FIG. 3 shows a sectional view of a vehicle window assembly according to a further embodiment of the invention.

In the embodiment shown in FIG. 3, the transport protection strip 14 is formed from two strip portions 60, 62. The first strip portion 60 comprises the insertion portion 46, and the second strip portion 62 comprises the contact portion 48. The first strip portion 60 has an undercut groove 64 facing the second strip portion 62, and the second strip portion 62 has a snap-fit protrusion 66 facing the first strip portion 60, which is joined to the groove 64 in an interlocking and, if required, releasable manner. The strip portions 60, 62 are each manufactured in an extrusion process and, after manufacture, can initially, optionally, be stored and handled separately from one another or in an already joined state.

In the embodiment shown in FIGS. 4a and 4b, the transport protection strip 14 comprises a support portion 68 extending in a direction essentially parallel to the contact portion 48 and the first main face 16 of the vehicle window 10 and with respect to the insertion portion 46 facing away from the contact portion 48 (in other words, substantially in a negative y direction). FIGS. 4a and 4b each show a lower region of the vehicle window assembly 1 in an orientation inclined by approximately 30° with respect to a normal 70 on the support surface 52, equivalent to the first main face 16 defining an angle of approximately 60° with the support surface 52 in the region of the peripheral region 18. Angles of this type occur in the peripheral region 18 of the window 10, for example, in the case of curved windshields having a convex first main face 16 (outer side) and a concave second main face 22 (inner side), which are stored and transported in an upright posture in accordance with the meaning explained above.

In FIG. 4b, a projection of the second connecting region 30 onto a projection line 72 orthogonal to the longitudinal extension direction of the transport protection strip 14 and inclined with respect to the first main face 16 of the vehicle window 10 by an angle $\beta$ is indicated with a first projection ray A. A projection of the support portion 68 onto the projection line 72 is indicated with a second projection ray B. In the projection, the support portion 68 extends beyond the second connecting region 30 by a distance dimension d indicated by a double arrow. As a result, the vehicle window assembly 1 is only supported on the support surface 52 by the transport protection strip 14, while the spring leg 36 is essentially free of force with regard to the weight force of the assembly 1 (cf. FIG. 4a).

The angle β is effectively an opposite angle to the angle defined between the first main face 16 and the normal 70 (cf. FIG. 4a) and is thus also approximately 30° in the situation shown in FIG. 4b.

Figure 5:
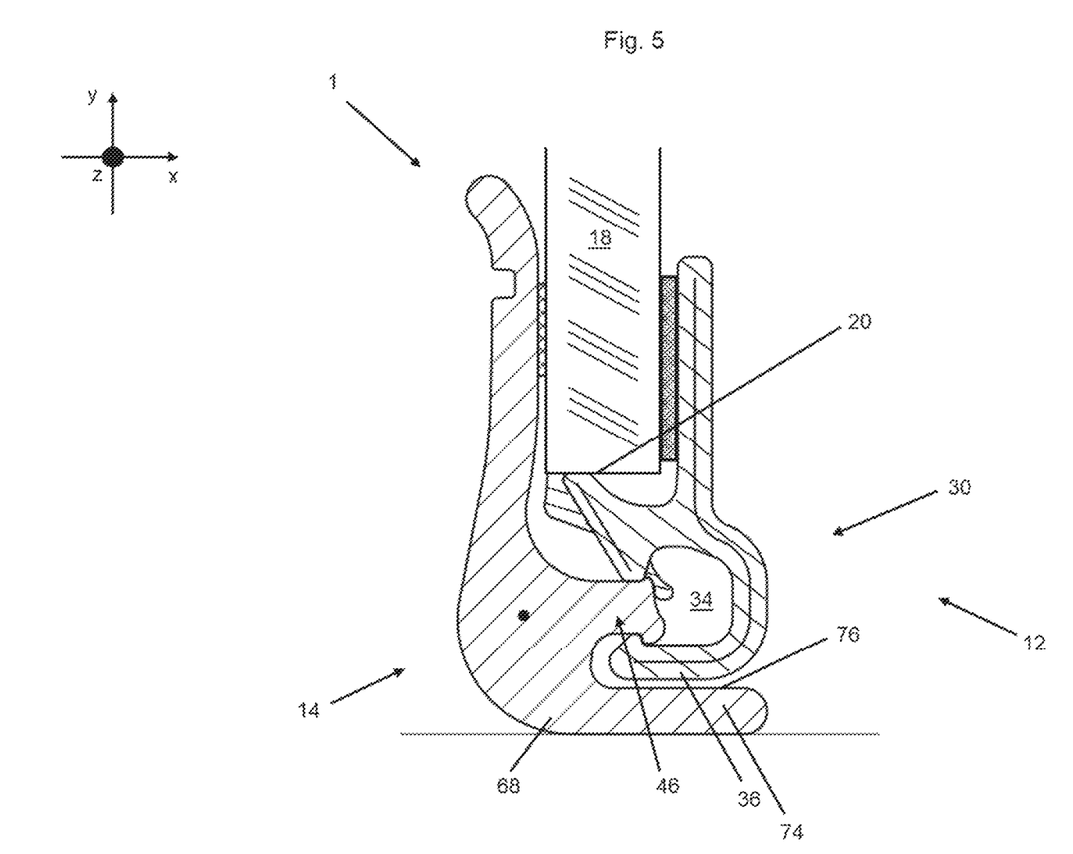
FIG. 5 shows a vehicle window assembly according to a further embodiment of the invention.

In the vehicle window assembly 1 shown in FIG. 5, the support portion 68 of the transport protection strip 14 comprises a protective leg 74 which is aligned essentially parallel to the insertion portion 46 and embraces and/or overlaps the second connecting region 30 of the profile strip 12 on the side of the connecting region 30 facing away from the edge 20, thereby additionally protecting the spring leg 36. For easy connection of the insertion portion 46 to the receiving groove 34, an upper surface 76 of the protective leg 74 facing the insertion portion 46 is spaced from the insertion portion 46 in such a manner that the spring leg 36 does not come into contact with the upper surface 76 of the protective leg 74.

In the embodiments according to FIGS. 4 and 5, removal of the transport protection strip 14 can be carried out in the manner described above with reference to FIG. 2. Alternatively, removal can also be effected by gripping or reaching behind the support portion 68 of the transport protection strip 14 projecting beyond the second connecting region 30 of the profile strip 12. In the case of a two-part transport protection strip 14 (cf. FIG. 3), it is also possible to provide a handling portion 56 on the contact portion 48 and/or a support portion 68 on the transport protection strip 14, whereby the respective advantages and possibilities explained above with reference to FIGS. 2, 4 and 5 also apply here.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Vehicle window assembly
10 vehicle window
12 profile strip
14 transport protection strip
16 first main face of window
18 (lower) peripheral region of window
20 edge of window
22 second main face of window
24 first connecting region of profile strip
26 fastening leg
28 double-sided adhesive tape
30 second connecting region of profile strip
32 base leg
34 receiving groove
36 spring leg
38 free end (spring leg)
40 free end (base leg)
42 receiving opening
44 sealing element
46 insertion portion of transport protection strip
48 contact portion of transport protection strip
50 connector
52 support surface
54 free end (contact portion)
56 handling portion
58 recess
60 first strip portion comprising insertion portion
62 second strip portion comprising insertion portion
64 groove
66 snap protrusion
68 support portion of transport protection strip
70 normal on support surface
72 projection line
74 protective leg (support portion)
46 upper surface of protective leg
A first projection ray
B second protection ray
d distance dimension
βangle

What is claimed is:

1. A vehicle window assembly, comprising:
a vehicle window comprising a first main face, a second main face facing away from the first main face, and an edge connecting the first main face to the second main face;
a profile strip which is connected to a peripheral region of the vehicle window by a first connecting region, and which has a second connecting region comprising a receiving groove configured to connect to a component adjacent to the vehicle window; and
a transport protection strip, comprising an insertion portion which is received in, and releasably connected to, the receiving groove,
wherein the transport protection strip comprises a contact portion which at least partially overlaps the first main face of the vehicle window in the peripheral region and is releasably connected to the vehicle window by a connector acting between the contact portion and the first main face, and
wherein the profile strip partially overlaps and is adhesively fixed to the second main face of the vehicle window.

2. The vehicle window assembly according to claim 1, wherein the first connecting region comprises at least one fastening leg which is fixed to the peripheral region of the vehicle window.

3. The vehicle window assembly according to claim 2, wherein the at least one fastening leg is fixed to the peripheral region of the vehicle window on the first main face.

4. The vehicle window assembly according to claim 2, wherein the at least one fastening leg is fixed to the peripheral region of the vehicle window on the second main face.

5. The vehicle window assembly according to claim 1, wherein the first main face forms an outer side of the vehicle window in an installed state on the vehicle, and the second main face forms an inner side of the vehicle window in the installed state.

6. The vehicle window assembly according to claim 1, wherein the insertion portion is connected to the receiving groove in a frictional and/or interlocking manner.

7. The vehicle window assembly according to claim 1, wherein, when viewed in a cross-section perpendicular to a longitudinal extension direction of the transport protection strip, the insertion portion and the contact portion extend in directions substantially transverse to one another.

8. The vehicle window assembly according to claim 1, wherein the connector comprises an adhesive, an adhesive film strip, a double-sided adhesive tape, a suction cup and/or a magnetic element.

9. The vehicle window assembly according to claim 1, wherein the transport protection strip comprises the connector.

10. The vehicle window assembly according to claim 1, wherein the insertion portion and/or the contact portion of the transport protection strip is or are segmented along a longitudinal extension of the transport protection strip, and/or wherein the connector is segmented along the longitudinal extension of the transport protection strip and/or is formed of a plurality of fixing elements.

11. The vehicle window assembly according to claim 1, wherein the transport protection strip comprises a first strip portion comprising the insertion portion and a second strip portion comprising the contact portion, wherein the first strip portion is joined to the second strip portion.

12. The vehicle window assembly according to claim 7, wherein the transport protection strip has a support portion which extends, when viewed in the cross-section perpendicular to the longitudinal extension direction of the transport protection strip, in a direction essentially parallel to the contact portion and/or the first main face of the vehicle window and, with respect to the insertion portion, faces away from the contact portion.

13. The vehicle window assembly according to claim 12, wherein the support portion extends beyond the second connecting region of the profile strip, when viewed along a projection line extending from the first main face of the vehicle, the projection line being orthogonal to the longitudinal extension direction of the transport protection strip and inclined with respect to the first main face of the vehicle window by an angle (β), the angle (β) having an absolute value equal to or smaller than 40°.

14. The vehicle window assembly according to claim 12, wherein the support portion at least partially embraces and/or overlaps the second connecting region on a side of the second connecting region facing away from the edge of the vehicle window.

15. A transport protection strip, comprising:
an insertion portion configured to join with a receiving groove of a profile strip connected to a peripheral region of a vehicle window, the receiving groove being configured to connect to a vehicle component adjacent to the vehicle window; and
a contact portion configured to at least partially overlap a first main face of the vehicle window in the peripheral region of the vehicle window and to be releasably fixed to the vehicle window by a connector acting between the contact portion and the first main face, wherein the connector includes an adhesive, an adhesive film strip, a double-sided adhesive tape, a suction cup and/or a magnetic element for adhering the contact portion directly to the first main face of the vehicle window.

16. The transport protection strip according to claim 15, wherein the connector is arranged at the contact portion and includes the adhesive, the adhesive film strip and/or the double-sided adhesive tape for adhering the contact portion directly to the first main face of the vehicle window.

17. The transport protection strip according to claim 15, wherein the transport protection strip is configured to protect the profile strip during transport or storage of the vehicle window with the profile strip connected to the vehicle window.

18. The vehicle window assembly according to claim 1, wherein the transport protection strip is configured to protect the profile strip and/or the vehicle window during transport or storage of the vehicle window assembly, and is configured to be removed from the profile strip before an installation of the component adjacent to the vehicle window.

19. The vehicle window assembly according to claim 1, wherein the connector includes an adhesive, an adhesive film strip, a double-sided adhesive tape, a suction cup and/or a magnetic element for adhering the contact portion directly to the first main face of the vehicle window, and wherein the component adjacent to the vehicle window is a vehicle component.

20. A vehicle window assembly, comprising:
a vehicle window comprising a first main face, a second main face facing away from the first main face, and an edge connecting the first main face to the second main face;
a profile strip which is connected to a peripheral region of the vehicle window by a first connecting region, and which has a second connecting region comprising a receiving groove configured to connect to a component adjacent to the vehicle window; and
a transport protection strip, comprising an insertion portion which is received in, and releasably connected to, the receiving groove,
wherein the transport protection strip comprises a contact portion which at least partially overlaps the first main face of the vehicle window in the peripheral region and is releasably connected to the vehicle window by a connector acting between the contact portion and the first main face, and
wherein the connector includes an adhesive, an adhesive film strip, a double-sided adhesive tape, a suction cup and/or a magnetic element for adhering the contact portion directly to the first main face of the vehicle window, and wherein the component adjacent to the vehicle window is a vehicle component.

* * * * *